United States Patent
Gray et al.

(10) Patent No.: US 10,836,654 B1
(45) Date of Patent: Nov. 17, 2020

(54) STABLE IMMOBILIZED AMINE SORBENTS FOR REMOVAL OF AN ORGANIC CONTAMINATE FROM WASTEWATER

(71) Applicant: United States Department of Energy, Washington, DC (US)

(72) Inventors: McMahan L. Gray, Pittsburgh, PA (US); Brian W. Kail, Pittsburgh, PA (US); Qiuming Wang, South Park, PA (US); Walter C. Wilfong, Clinton, PA (US)

(73) Assignee: U.S. Department of Energy, Washington, DC (US)

( * ) Notice: Subject to any disclaimer, the term of this patent is extended or adjusted under 35 U.S.C. 154(b) by 80 days.

(21) Appl. No.: 16/176,804

(22) Filed: Oct. 31, 2018

Related U.S. Application Data

(60) Provisional application No. 62/579,564, filed on Oct. 31, 2017.

(51) Int. Cl.
| | | |
|---|---|---|
| *B01J 20/26* | (2006.01) | |
| *B01J 20/28* | (2006.01) | |
| *C02F 1/28* | (2006.01) | |
| *B01J 20/10* | (2006.01) | |
| *C02F 101/36* | (2006.01) | |
| *C02F 101/30* | (2006.01) | |
| *C02F 101/34* | (2006.01) | |

(52) U.S. Cl.
CPC ............. *C02F 1/285* (2013.01); *B01J 20/103* (2013.01); *B01J 20/262* (2013.01); *B01J 20/2803* (2013.01); *B01J 20/28011* (2013.01); *B01J 20/28016* (2013.01); *B01J 20/28026* (2013.01); *C02F 2101/306* (2013.01); *C02F 2101/308* (2013.01); *C02F 2101/345* (2013.01); *C02F 2101/36* (2013.01)

(58) Field of Classification Search
CPC combination set(s) only.
See application file for complete search history.

(56) References Cited

U.S. PATENT DOCUMENTS

| | | | |
|---|---|---|---|
| 10,065,174 B1* | 9/2018 | Wifong | B01J 20/267 |
| 2010/0011956 A1* | 1/2010 | Neumann | B01D 53/1475 95/151 |

* cited by examiner

*Primary Examiner* — Ellen M McAvoy
*Assistant Examiner* — Chantel L Graham
(74) *Attorney, Agent, or Firm* — Timothy L. Harney; Daniel D. Park; Brian J. Lally

(57) ABSTRACT

The present disclosure relates to a method for the removal of organic contaminates from wastewater. The method comprises contacting wastewater comprising water and an organic contaminate with a basic immobilized amine sorbent, where the basic immobilized amine sorbent comprises a polyamine bound to an inorganic support via a linker, such that contacting the wastewater causes at least a portion of the organic contaminate to bind to the basic immobilized amine sorbent.

19 Claims, 7 Drawing Sheets

STABLE IMMOBILIZED AMINE SORBENTS FOR REMOVAL OF AN ORGANIC CONTAMINATE FROM WASTEWATER

CROSS REFERENCE TO RELATED APPLICATIONS

This application claims the benefit of U.S. Provisional Application No. 62/579,564 filed on Oct. 31, 2017. The disclosure of the full application is incorporated herein by reference.

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relates to a method for the removal of an organic contaminate from wastewater, the method comprising contacting a wastewater comprising an organic contaminate and water with a basic immobilized amine sorbent such that at least a portion of the organic contaminate binds to the basic immobilized amine sorbent; a basic immobilized amine sorbent comprising a polyamine bound to an inorganic support via a linker; methods of preparing the basic immobilized amine sorbent, and various other applications thereof.

BACKGROUND OF THE INVENTION

Industries such as the textile industry produce large volumes of wastewater during their operations. In the textile industry, dyeing fabrics alone requires a large volume of water to be expended to produce a colored consumer product and typically this water requires the addition of other components. For example, to dye 1 kg of cotton with reactive dyes, approximately 0.8 kg of NaCl is required along with 30-60 g of the dyestuff and 70-150 L of water. However, not all dye is incorporated into the cotton. This inefficient dyeing process generates a waste stream containing the unfixed dye content, additives like NaCl and other salts, and acidic or basic pH values. Typical amounts of unfixed dye content for various dyes are shown in Table 1.

TABLE 1

Typical Unfixed Dye Content for Dying Cotton in the Textile Industry

| Dye Type | Unfixed the (wt %) |
| --- | --- |
| Azoic dyes | 5-10 |
| Reactive dyes | 20-50 |
| Direct dyes | 5-20 |
| Pigment | 1 |
| Vat dyes | 5-20 |
| Sulphur dyes | 30-40 |

These unfixed dyes must be removed to recycle the cleaned water back into the dye process to alleviate costs associated with using new fresh water and minimize environmental concerns. Current treatment options include activated sludge, coagulation, advanced oxidation processes (AOPs), electrochemical oxidation, biological degradation and membrane filtration technologies, and amine-based sorbents.

The present method provides for the removal of an organic contaminant such as these unfixed dyes from wastewaters. The method comprises contacting a wastewater stream comprising water and an organic contaminate or contaminants with a basic immobilized amine sorbent (BIAS), such that the organic contaminate or contaminants binds to the BIAS, removing it from the water. The BIAS comprises a polyamine species covalently attached to an inorganic support via a reactive epoxysilane and/or a mono or polyepoxide linker to form water stable sorbents which resist leaching in flowing conditions. The BIAS operates to remove the organic contaminate as the organic contaminate is bound by the polyamines functional groups (—NH2, —NH, —N) as well as hydroxyl groups generated by the epoxide ring opening reaction with the amine. Furthermore, additional polyepoxide-based and di-vinyl-based cross-linkers are viable alternatives to covalently stabilize the active amine species.

Key advantages of the embodiments over existing methods and sorbent materials are the fast and easy BIAS (sorbent) preparation, low raw material costs, recyclability, and the advantage of the lack of sodium and calcium absorption by the BIAS. The absence of Na and Ca affinities exhibited by the BIAS indicates that the sorbent will capture organic contaminates in the presence of inherently accompanying additives from a variety of water sources, e.g. textile runoff and drinking water, which may also contain these metals.

These and other objects, aspects, and advantages of the present disclosure will become better understood with reference to the accompanying description and claims.

SUMMARY OF THE INVENTION

The present disclosure relates to a method for the removal of organic contaminants from wastewater. The method comprises contacting wastewater comprising water and an organic contaminate with a basic immobilized amine sorbent, where the basic immobilized amine sorbent comprises a polyamine bound to an inorganic support via a linker, such that contacting the wastewater causes at a least a portion of the organic contaminate to bind to the basic immobilized amine sorbent.

These and other features of the present invention will become clear upon further review of the following specification and drawings.

DETAILED DESCRIPTION OF THE INVENTION

Figure 1:
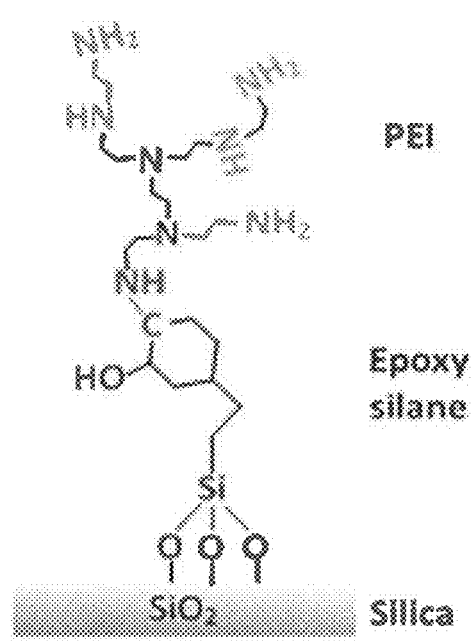
FIG. 1 illustrates the BIAS 181D comprising the polyamine polyethylenimine bound to an inorganic support of silica, via an epoxy linker of an epoxysilane.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of a method for the removal of an organic contaminate from wastewater comprising contacting the organic contaminate with a basic immobilized amine sorbent, sorbent materials, and methods of their preparation.

Wastewater

As contemplated within this disclosure, wastewaters necessarily comprise water and at least one organic contaminate or several organic contaminates. Organic contaminates may be present in the water as dissolved organic compounds or otherwise present in forms such as droplets, colloids, films, or other mixture types. One exemplary organic contaminate are unfixed organic dyes produced in the textile industry. In addition to dyes, the disclosed method is applicable for removing of organic contaminates that bear structural and/or chemical similarity to the dye molecules. Such similar organic contaminates suited for removal by the method include phenols, polyphenols such as proanthocyanidins from coffee, and various pesticides and herbicides which contain any of these functional groups. In another example, common agricultural and urban herbicides like atrazine and other triazane class herbicides, 2,4-Dichlorophenoxyacetic acid (2,4-D) and metalochlor as well as insecticides such as chloropyrifos and halofenozide have chloride functionalities that will react with the primary and secondary amines of the BIAS to form covalently bound amine derivatives of the herbicide/insecticide which should behave in a similar way to the iodide groups of FD&C Red #3. Additionally, glyphosate bears both organo-phosphate and carboxylic acid functionalities which may participate in hydrogen bonding and ionic interactions which would act similarly to phycocyanobilin or the anionic organo-sulfate groups found in FD&C Blue #1, in binding interactions with the sorbent material. Furthermore organoarsenic groups, such as the arsonic acid functionality of roxarsone, in addition to its phenol group, are anticipated to behave similarly to the FD&C Blue #1 and proanthocyanidins as well. Lastly, a class of compounds commonly known as perfluoro-compounds, like perfluorooctanoic (PFOA) Dupont's GenX, perfluorobutanesulfonic acid, perfluorooctanesulfonyl fluoride, perfluorooctanesulfonamide, perfluorooctanesulfonic acid, perfluorooctanesulfonate.

Within this disclosure, the organic contaminate is present in a concentration from about 100 ppt to about 50% (w/w). The organic contaminates have molecular weight (MW) in a range from about 50 g/mol to about 2000 g/mol. In a preferred embodiment, the organic contaminates have a MW ranging from about 100 g/mol to about 1000 g/mol.

Preferential organic contaminates have one or more available functional groups: halide, anionic aromatic or aliphatic sulfate groups, aromatic or aliphatic carboxylate and carboxylic acid groups, aromatic or aliphatic phosphate groups or arsonic acid groups, perfluoro-based groups, or aliphatic alcohol or phenolic alcohol groups, where an available functional group is one which is capable of forming a covalent bond to the polyamine of the BIAS. These groups are capable of interacting with bound primary and secondary amine groups on the sorbent surface and within the pore structure via hydrogen bonding or ionic interactions. These bonds effectively bind the organic contaminates, removing them from the contaminated wastewater.

Within this disclosure, the wastewater may also include constituents such as metals commonly used in the dye process, up to 1% (w/w). The wastewater has a pH in a range from about 2 to about 12. A preferred pH range is from about 4 to about 11.5. Additionally, other species may be present in the wastewater. As noted supra, metals such as Ca and Na are commonly used as an activator, driving the dye into textile, promoting maximum exhaustion of dye molecules during dyeing and electrolyte for migration, adsorption, and fixation of the dyestuff to the material, during dye processes and may be present in the wastewater.

Basic Immobilized Amine Sorbent

The basic immobilized amine sorbent (BIAS) used in the disclosed method comprises an inorganic support and a polyamine bound via an epoxy linker as depicted in FIG. 1 featuring the polyamine polyethylenimine (PEI) bound to an inorganic support of silica or alumina, via an epoxy linker of epoxysilane.

Inorganic Support

The inorganic support serves to provide structural support to the BIAS, the polyamine serves as the primary sorbent component, and the linker binds the other two components together as an integrated sorbent.

The BIAS is formed upon an inorganic support which serves to provide a structural component to the BIAS. A preferential inorganic support is silica. Inorganic supports include materials such as such as SBA 15 (a mesoporous silica with a particle size less than 150 µm and 4 nm pore size), biochar, MCM-41, zeolite 13X, fumed silica, precipitated silica, silica gel, silica pellets, alumina, hydroxylated alumina particles or pellets similar to gibbsite, diaspore or boehmite, and iron oxide particles.

Chemical characteristics of the BIAS supports such as silica and zeolite promote binding of sorbent pellet constituents. The inorganic support preferentially comprises hydroxyl functional groups which act as reaction sights for the linker component. For example, the Si—OH groups of silica-supported amine/silica sorbents and also Al—OH groups of amine/zeolite sorbents interact chemically with the epoxy linkers to provide an bridge to the primary absorbing polyamines as well as increase the mechanical and structural integrity of the final BIAS particles.

Physical characteristics of the BIAS inorganic supports include pore volumes of 1 to 5 $cm^3$/g, surface area of 1 $m^2$/g to 1000 $m^2$/g and either acid or basic surface chemistry. Preferred inorganic supports have an average particle size ranging from about 10 µm to about 800 µm. In a preferred embodiment, the inorganic supports have an average particle size ranging from about 80 µm to about 500 µm. Additionally, the inorganic supports may be in pellet forms, where pellet forms also include beads. When in pellet form, the inorganic support pellets have an average pellet size ranging from about 0.5 mm to about 5 mm. In a preferred embodiment, the inorganic supports have an average pellet size from about 1 mm to about 3 mm.

Additional sorbents in the form of polyamine/epoxy/$SiO_2$ and polyamine/acrylamide/N,N'-methylene bisacrylamide/$SiO_2$ are viable materials for capturing organic contaminates via the amine functional groups and potentially others.

Polyamine

A polyamine component attached to the inorganic support via the linker serves as the primary sorbent component of the BIAS. The polyamines applicable to the disclosed method include polyamines such as: diethylene triamine (DETA), ethylenimine oligomeric mixture ($EI_{423}$, linear/branched mixture with an average molecular weight of about 400 g/mol), polyethylenimine (PEI) with molecular weights between 400 and 20,000, E100 (linear, cyclic, branched mixture) with an average molecular of 250 g/mol-300 g/mol, tetraethylenepentamine (TEPA, linear, with a molecular weight of 198.3, pentaethylenehexamine with a molecular weight of 232.37. All of these amines share the valuable property of being soluble in methanol and contain multiple amine nitrogen atoms to react with epoxides. Of these, PEI, E100 and TEPA express low volatility, are readily available, are inexpensive and allow of a significant degree of conformational flexibility which aids both the crosslinking, immobilization and contaminant binding.

Preferred amines for the BIAS are polyamines that contain more than one as well as any combination of the following amine groups: primary (—$NH_2$), secondary (—NH), and tertiary (—N) amines. These polyamines could be nearly pure single components or a combination of different polyamines. Examples of some polyamines used in the BIAS include the following: ethylenimine oligomer mixture ($EI_{423}$, linear/branched mixture, —N/—NH/—$NH_2$ ratio of 1.3:1:2.2), polyethylenimine with molecular weights between 400 and 20,000 (PEI, —N/—NH/—$NH_2$ ratio of 1.3:1:1.7 for $PEI_{800}$), E100 (linear, cyclic, branched mixture), tetraethylenepentamine (TEPA, linear, —N/—NH/—$NH_2$ ratio of 0:1:0.7), pentaethylenehexamine, and hexaethyleneheptamine. Furthermore, these examples of amines and other potential amines should have but are not limited to a molecular weight (MW) range between 180 and 1,000,000. In a preferred embodiment, the polyamine has a MW ranging from about 200 g/mol to about 1,000,000 g/mol. In a more preferred embodiment, the polyamine has a MW ranging from about 400 g/mol to about 1,000 g/mol.

Preferentially, BAIS sorbents may possess an amine loading between 1 and 65 wt %. Preferred BIAS sorbents possess an amine loading between 20 and 45 wt %. More preferred BIAS sorbents possess an amine loading between 45 and 65 wt %.

Other preferred amines include the polyamines—polyethylenimine (Mw=400 to 1,000,000), ethylenediamine, diethylenetriamine, triethylenetetramine, tetraethylenepentamine, pentaethylenehexamine, hexaethyleneheptamine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N'-Diphenyl-p-phenylenediamine, N,N'-Diisopropyl-1,3-propanediamine, polyvinyl amine, poly(allylamine). Most preferred polyamines include polyethylenimine with a MW ranging from about 400 to about 2,000 as in $PEI_{800}$.

Linker

The linker serves to either immobilize (bind) the organic contaminate adsorbing polyamines to the inorganic support or polymerize neighboring polyamines around or within the support matrix. Necessarily, linkers must be able to bond to both the inorganic support and/or the polyamine such that the polyamine is immobilized on or within the support matrix. Ideally the linker to the inorganic support will contain enough conformational flexibility to allow complete reaction with the amine while still allowing for full bonding of the linker or polyamine to the silica surface. Additionally, the amine-linker complex should also allow for flexibility such that some molecular motion can occur to maximize the binding of the organic contaminate.

Exemplary linkers include the epoxies: epoxysilanes, non-silane epoxides as presented below, or amine-based linkers. Preferred linkers are the epoxysilanes such as 2-(3,4-epoxycyclohexyl)ethyltrimethoxysilane (ECTMS or ES), 2-(3,4-epoxycyclohexyl)ethyltriethoxysilane, 5,6-epoxyhexyltriethoxysilane, 2-(3,4-epoxycyclohexyl)ethylmethyldiethoxysilane, (3-glycidoxypropyl)methyldimethoxysilane, (3-glycidoxypropyl)trimethoxysilane, (3-glycidoxypropyl)dimethylethoxysilane, 1,3-bis[2-(3,4-epoxycyclohexyl)ethyl]tetramethyldisiloxane, (3-Bromopropyl)trimethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate, and ethoxy versions of these methoxy-based silanes if not mentioned directly above.

Additionally, linkers for use in the method include non-silane, epoxy-based linkers such as bisphenyl A diglycidyl ether (di-epoxide), N—N-diglycidyl-4-glycidyloxyaniline (tri-epoxide), 4,4'-methylenebis(N,N-diglycidylaniline) (tetra-epoxide), 1,2-epoxybutane, 2,3-epoxybutane as either cis- or trans-isomers. Amide-based linkers such as di-vinyl based such as N,N'-methylene bisacrylamide are viable.

In a preferred embodiment, the epoxysilane and non-silane epoxy-based linkers have a MW ranging from about 50 g/mol to about 1,000,000 g/mol. In a more preferred embodiment, the epoxysilane and non-silane epoxy-based linkers have has a MW ranging from about 50 g/mol to about 500 g/mol.

Further, linkers for use in the method include amine-based linkers such as the amino acids amino acids—arginine, asparagine, aspartic acid, cysteine, methionine, tryptophan, histidine, lysine, glutamine, glutamic acid, and tyrosine, and aminosilanes—3-aminopropyltriethoxysilane, 3-(2-Aminoethylamino)propyldimethoxymethylsilane, Bis[3-(trimethoxysilyl)propyl]amine, N-[3-(Trimethoxysilyl)propyl]aniline, and 1-[3-(Trimethoxysilyl)propyl]urea.

Where non-silane, epoxy-based linkers are utilized, additives to encourage pore formation such as polyethyleneglycol or polytetrahydrofuran may be utilized.

Within the disclosure, preferred linkers include epoxysilanes, tri-epoxide, and di-vinyl linkers. Exemplary epoxysilanes include 2-(3,4-epoxycyclohexyl)ethyltrimethoxysilane (ECTMS or ES), D.E.R 332 (diepoxide, E2; 5.7-5.9 mmol epoxide/g), N—N-diglycidyl-4-glycidyloxyaniline (triepoxide, E3; 10.8 mmol epoxide/g) or 4,4'-methylenebis(N,N-diglycidylaniline) (tetra-epoxide, E4; 9.5 mmol epoxide/g) which covalently immobilizes the dye-adsorbing amine sites within low cost, porous silica particles beads or pellets. BIAS Characteristics The BIAS appropriate for use within the method have 100-500 µm particle sizes or are prepared on 1 mm to 3 mm pelletized materials, with a particle density between 1.4 g/cm$^3$ and 2 g/cm$^3$ and a packed column volume of approximately 2 cm$^3$/g. The BIAS particles are preferentially 80 µm to 500 µm particle size while the BIAS pellet is 1 mm to 3 mm. Preferentially, polyamines are bound throughout a porous inorganic support.

Typical BIAS are comprised of at least 12% polyamine by total dry BIAS weight, where total dry BIAS weight includes the mass of the inorganic base, polyamine, and linker. Preferred sorbents are comprised of from about 1% to about 50% polyamine by total dry BIAS weight. More preferred sorbents are comprised of from about 3% to about 30% by total dry BIAS weight.

Typical BIAS are comprised of at least 0.1% linker by total dry BIAS weight, where total dry BIAS weight includes the mass of the inorganic base, polyamine, and linker. As noted supra; however, the final BIAS may further include additives including polyethyleneglycol or polytetrahydrofuran or other additives. Preferred sorbents are comprised of from about 1% to about 40% linker by total dry BIAS weight. More preferred sorbents are comprised of from about 10% to about 20% linker by total dry BIAS weight.

In another typical embodiment of the particle sorbent, the PEI$_{800}$ is combined with a non-silane polyepoxide, specifically N—N-diglycidyl-4-glycidyloxyaniline (Sigma Aldrich, tri-epoxide, E3) and all functionalized on 100 µm or 500 µm silica (CS 2129, PQ Corporation). The optimum sorbent, labeled as 40% E3-PEI/SiO$_2$-100 µm, contained 16 wt % E3 and 24 wt % PEI$_{800}$ immobilized on 100 µm particle size silica (60 wt %), and has a PCR value of 81% plus an OCR value of 107% after accelerated H2O testing. In yet another embodiment of the particle sorbent, the PEI$_{800}$ was combined with di-vinyl-based crosslinkers, specifically N,N'-Methylenebis(acrylamide). The optimum sorbents, labeled 14.9% PEI-Aam-MBAA/SiO$_2$-100 µm and 13.9% PEI-MBAA/SiO$_2$ 100 µm, contained 13-15 wt % immobilized organics on 100 µm particle size silica, and had OCR values between 99 and 103% after accelerated H$_2$O testing BIAS for use within the method exhibit stability in aqueous environments. BIAS stability in a flowing liquid environment is determined through an accelerated H$_2$O method, which involved contacting 0.5 g of BIAS with 0.5 mL/min of flowing H$_2$O for 20 min. Because organic contaminate capture by the sorbents occurs in flowing aqueous systems, the incorporated contaminate capture (amines and others) must resist leaching from the sorbent and resist rearrangement or agglomeration within the sorbent's pores, all of which could degrade the capture capacity of the sorbent. To assess the leach resistance of the BIAS' organic species, the organic content of the fresh and accelerated H$_2$O-treated sorbents was determined by heating the sorbents at 105° C. in air for 45-60 min to desorb H$_2$O and CO$_2$ pre-adsorbed from ambient, followed by heating up to 800° C. in air and measuring the weight loss. Organic content retained (OCR) values were calculated by dividing the organic content of the H$_2$O-treated sorbent by that of the fresh sorbent and multiplying by 100. Higher OCR values corresponded to sorbents that would be more stable in the liquid dye capture processes. For additional assessment of sorbent stability, CO$_2$ capture capacities of the fresh and H$_2$O-treated sorbents were determined by flowing 60 mL/min of 10-85% CO$_2$ over pre-treated sorbents (105° C., N$_2$, 60 min) at 60° C. for 60 min. Percentage of CO$_2$ capture retained (PCR) values were calculated by dividing the CO$_2$ capture of the H$_2$O-treated sorbent by that of the fresh sorbent and multiplying by 100. We previously used PCR values to assess the H$_2$O stability of BIAS sorbents to flowing liquid H$_2$O, and/or H$_2$O vapor. Importantly, higher PCR values correspond to sorbents that both retained more of their organic (amine) species after accelerated H$_2$O-treatment, and resisted rearrangement and agglomeration within the pores.

BIAS having an OCR value of greater than about 30 are preferred. More preferred BIAS have an OCR value greater than 50. BIAS having an OCR ranging from about 80 to about 90 are more preferred. BIAS having an OCR value ranging from about 90 to about 100 are most preferred. BIAS having a PCR value ranging from about 40 to about 70 are preferred. BIAS having an PCR value of from about 70 to about 100 are most preferred.

BIAS organic contaminates sorption capacity is typically calculated either on a weight-percent-of-sorbent basis or percent reduction from a feed solution. For weight percent basis, the weight of adsorbed contaminant is divided by the weight of sorbent and multiplied by 100. For the percent reduction from feed basis, the amount of the adsorbed contaminant is divided by the amount of contaminant in the feed solution and multiplied by 100. The sorption capacity of a sorbent is best measured by exposing the sorbent to a known volume of a feed liquid with a known concentration of contaminant, by flowing the contaminant feed solution at a defined flow rate over a known bed volume of sorbent. Typical flow testing allows for flow rates of approximately ¼ bed volume per minute for a total contact time of 40 minutes. Preferential determination of sorbent capture capacity involves placing approximately 0.5 gram of sorbent material into a 5 ml column and flowing 40 ml of the contaminate solution across the bed at a flow rate of 0.5 ml/min at room temperature. the collected effluent and initial feed solution are analyzed for the presence and concentration of the contaminant by appropriate instrumentation such as: UV-visible spectroscopy, high pressure liquid chromatography, ion chromatography, or by inductively coupled plasma with mass spectrometry or optical emission spectrometry detection.

Contacting

Figure 2:
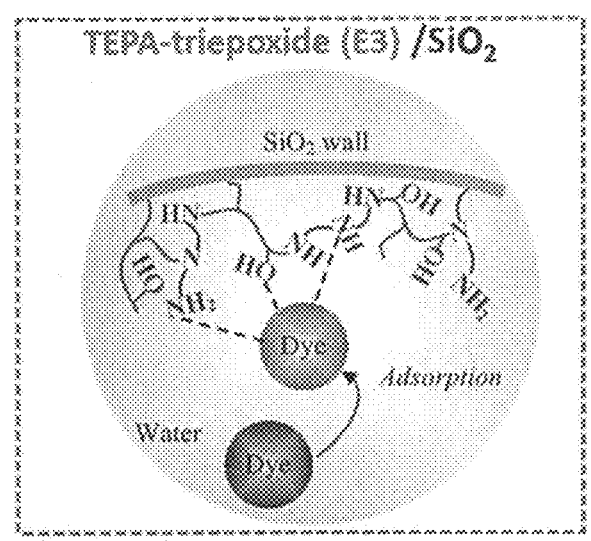
FIG. 2 illustrates the removal of an organic contaminate dye from water by absorption of the organic contaminate to a BIAS comprising tetraethylenepentamine (TEPA) bound to a silica support via the epoxy triepoxide (E3).

In carrying out the method, contacting provides bringing the organic contaminate and BIAS into physical and or chemical communication with one another, such that at least a portion of the organic contaminate present in the wastewater is bound by the BIAS. In being bound, the organic contaminate is in chemical communication with the BIAS through interactions such as but not limited hydrogen bonding, ionic interactions, and covalent bonding. With respect to covalent bonding, organic molecules containing functional groups such as aldehydes, ketones and esters are susceptible to nucleophilic attack by the amine groups at the carbonyl carbon to form amide bonds. Moreover, organo-halides, bromides and iodides can undergo $S_N1$ and $S_N2$ type reactions with primary and secondary amines to form amine functionalized products which would then also be covalently bounded to the sorbent material. As depicted in FIG. 2, the removal of an organic contaminate (dye) from wastewater is by absorption of the organic contaminate to the BIAS. In operation, a BIAS would operate to bind the organic contaminate from the water such that in a closed feed system, wastewater flowing through a BIAS loaded sorbent filter would have at least a portion of the organic contaminate bound to the BIAS and the wastewater filtrate organic contaminate concentration would be lessened respectfully.

Contacting may be carried out through any of one or more operations; for example, filtration of a wastewater stream. Wastewater supply for contacting includes any flowing or stagnant aqueous systems with organic contaminates. Exemplary supplies for contacting include industrial wastewater streams with dye materials, food processing waste water streams, coffee bean wastewaters, drinking water treatment systems, ponds, rivers, lakes, seawater, and groundwater. Exemplary systems for performing contacting includes cartridge filtration or batch contact with agitation.

Examples

An array of (BIAS) was prepared by dissolving 4.0 g amounts of a combination of a polyamine, 2-(3,4-epoxycyclohexyl)ethyltrimethoxysilane (epoxysilane, ECTMS) or Mono-(2,3-epoxy) propylether terminated polydimethylsiloxane such as MCR-E11 PDMS (Gelest), and an aminosilane in 100.0 mL of methanol (99.8%, Sigma-Aldrich). Polyamines included polyethylenimine Mw=800 (PEI$_{800}$, Sigma-Aldrich), triethylenetetramine (TETA, Sigma-Aldrich), diethylenetriamine (DETA, Sigma-Aldrich), and ethyleneimine E100 (E100, Huntsman); aminosilane linkers included 3-aminopropyltrimethoxysilane (APTMS, Sigma-Aldrich), N-(3-trimethoxysilyl) propyl)ethylenediamine (TMPED), and N-(3-Trimethoxysilylpropyl)diethylenetriamine (TMPDET). These solutions containing different ratios of polyamine/linkers were added to 6.0 g of amorphous silica (80 and 100 μm, PQ CS 2129, PQ Corp.) in a 500 mL round-bottom flask, which was placed in a rotary-evaporator and heated at 80° C. while gradually pulling a vacuum of 200 to 900 mbar (absolute pressure of 800 mbar to 100 mbar) for 60 minutes to evaporate methanol. Once dried, sorbents containing epoxysilane were further heated in the rotary-evaporator at 90° C. for 60 to 90 minutes under atmospheric pressure to react the epoxysilane with the amine groups of the polyamines or aminosilanes. The resulting sorbents were about 80 μm-sized particles and were comprised of about 25 to 50 wt % as the impregnated species.

In another embodiment of the particle sorbent, PEI$_{800}$ is combined with a non-silane polyepoxide, specifically N—N-diglycidyl-4-glycidyloxyaniline (Sigma Aldrich, triepoxide, E3), and all functionalized on 100 μm or 500 μm silica (CS 2129, PQ Corporation). An array of these polyepoxide-based BIAS was prepared in the roto-vap using a similar procedure as that for the epoxysilane-based BIAS 181D. The PEI/polyepoxide/MeOH (4.0-5.0 g PEI+polyepoxide) impregnation solution was mixed with 5.0-6.0 g of silica (100 μm or 500 pin, PQ CS 2129, PQ Corp.) in a 250 mL round-bottom flask, which was placed in a rotary-evaporator and heated at 40° C. while rotating at 100 rpm and sequentially pulling a vacuum of 200 to 900 mbar for 60 minutes to evaporate methanol. Once visually dried, the sorbents were further heated in an oven at 105° C. for 15 minutes to remove any remaining solvent. Next, they were sealed in a vial to minimize air exposure (avoid amine oxidation) and were heated for an additional 45 min to complete the amine-epoxide reactions. Final organic contents of the E3-based sorbents ranged from 30 to 50 wt %, with 1.7 to 30 wt % E3 to give E3/PEI$_{800}$ ratios between 0.04 and 1.50. A PCR value of 81 and an OCR value of 107.5% after accelerated H$_2$O testing revealed that the optimum sorbent contained 16 wt % E3 and 24 wt % PEI$_{800}$ immobilized on 100 μm particle size silica (60 wt %). The corresponding 500 μm size sorbent was also stable, having an OCR of 94.5%

In yet another embodiment of the particle sorbent, the PEI$_{800}$ was combined with di-vinyl-based crosslinkers instead of epoxysilanes or polyepoxides. An array of basic immobilized amine sorbents (BIAS) was prepared by the following method. First, 3.0-8.0 g of PEI$_{800}$ was dissolved in 40 mL of DI water and 40 mL of methanol in a 250 mL flask. 10 g of silica (SiO$_2$, 100 μm or 500 μm, PQ CS 2129, PQ Corp.) was added to the PEI/H$_2$O/MeOH solution and the resulting mixture was degassed for 15 min by purging N$_2$ gas. Then 0.2-0.35 g of ammonium persulfate (APS) and 100-200 μL of N,N,N',N'-Tetramethylethylenediamine (TMEDA) were added. The resulting mixture was gently rotated for an additional 10 min at 70° C. to generate free radicals on PEI and SiO$_2$. Meanwhile, a well-mixed solution containing 0-1.0 g of Acrylamide, 1-4.0 g of N,N'-Methylenebis(acrylamide) (MBAA) and 20 g of methanol was degassed for 10 min and transferred into the flask. The solution was stirred at 220 rpm at 800 mbar vacuum for 2 hours and then sequentially pulling a vacuum of 400-100 mbar for additional 2 hours. The product was rinsed with DI water to remove loosely attached compounds and dried in an oven at 70° C. overnight to get the final product.

Performance

The natural dyes used in this survey were Watkins brand "100% natural food coloring" with the following dye components: Blue=Spirulina extract, Red=Fruit juice extract, yellow=turmeric extract. The synthetic dyes used in this survey were McCormick brand "Neon Food Coloring" with the following dye components: Blue=FD&C Blue 1, Green=FD&C Blue 1 and FD&C Yellow 5 and Purple=FD&C Blue 1, FD&C Red 40 and FD&C Red 3. The concentrations of dyes in all solutions were determined by single wavelength light absorption and dye color analysis using a PerkinElmer Lambda 35 UV/VIS Spectrometer. All dye feed solutions were prepared at 1% (w/w) solutions of the as received, pre-mixed dye in RO water. Calibration standards were prepared at 0.0625%, 0.125%, 0.25%, 0.5%, 1% and 2% (w/w) dye in RO water. To ensure stable dye absorption band positions during calibration, the pH of the dyes was maintained by diluting the calibration standards with 1% (w/w) acetic acid and background correcting the spectrometer with a 1% acetic acid solution. Typical dilutions of the calibration standards, eluent solutions and feed solutions that contained the natural dyes were between 1:50 and 1:10 while that of the synthetic dyes were between 1:100 and 3:50, to maintain absorbance between ~0.02 unit and 1 absorbance unit. The spectra were collected from 780 nm to 380 nm at a scan speed of 960 nm/min with a resolution of 1 nm under ordinate mode A. The slit width was 1 nm. The absorbance intensity, was measured at 420 nm, 500 nm, 520 nm and 620 nm and collected every cycle with a cycle time of 1 second.

TABLE 2

Composition and accelerated H$_2$O characterization of BIAS sorbents
Table 2 shows the compositions, and both the PCR and OCR values of sorbents screened via accelerated H$_2$O testing.

| Sorbent | Organic content (wt %) | Polyamine/Aminosilane/ Epoxysilane ratio | CO$_2$ ads, fresh (mmol CO$_2$/g) | PCR (%) | OCR (%) |
|---|---|---|---|---|---|
| 71 | 39 | PEI$_{800}$ only | 2.8 | ~22 | 11.6 |
| NETL32D (500 μm) | 40 | PEI$_{800}$/TMPED-12/28 | 2.1 | 42.9 | 44.5 |
| NETL32D (80 μm) | 40 | PEI$_{800}$/TMPED-12/28 | 1.7 | 32.0 | |

TABLE 2-continued

Composition and accelerated $H_2O$ characterization of BIAS sorbents
Table 2 shows the compositions, and both the PCR and OCR values of sorbents screened
via accelerated $H_2O$ testing.

| Sorbent | Organic content (wt %) | Polyamine/Aminosilane/ Epoxysilane ratio | $CO_2$ ads, fresh (mmol $CO_2$/g) | PCR (%) | OCR (%) |
|---|---|---|---|---|---|
| NETL009 | 40.7 | TETA/TMPED/ES-12/21/7 | 1.8 | 45.8 | 60.1 |
| NETL009 | 50.6 | PEI$_{800}$/TMPED/ES-15/27/9 | 1.4 | 69.8 | 73.5 |
| NETL009 | 51.0 | TETA/TMPED/ES-15/27/9 | 1.8 | 47.2 | 57.2 |
| NETT.:004 | 40.6 | PEI$_{800}$/TMPDET/ES-12/21/7 | 1.5 | 56.3 | |
| NETL009 | 40.8 | PEI$_{800}$/APIMS/ES-12/21/7 | 1.3 | 62.7 | 65.5 |
| NETL181 | 38.7 | PEI$_{800}$/TMPED/ES-12/13/13 | 1.2 | 76.7 | 77.3 |
| NETL181 | 41.3 | PEI$_{800}$/TMPED/ES-12/21/7 | 1.6 | 60.1 | 53.4 |
| NETL181 | 40.8 | PEI$_{800}$/TMPED/ES-12/7/21 | 1.1 | 63.7 | 79.9 |
| NETL181 | 40.7 | PEI$_{800}$/ES-12/28 | 0.8 | 81.3 | 102.5 |
| NETL002 | 40.9 | E100/ES-12/28 | 0.5 | 74.5 | |
| NETL002 | 40.5 | TEPA/ES-12/28 | 0.9 | 64.0 | |
| NETL002 | 40.9 | DETA/ES-12/28 | 0.8 | 72.2 | |

Critically, because the BIAS may be used in a flowing wastewater environment, it is imperative that nearly all the organic content be retained after accelerated $H_2O$ testing. In a preferred embodiment, the BIAS has an OCR greater than 80 In a more preferred embodiment, the BIAS has an OCR greater than 90.

Figure 3:
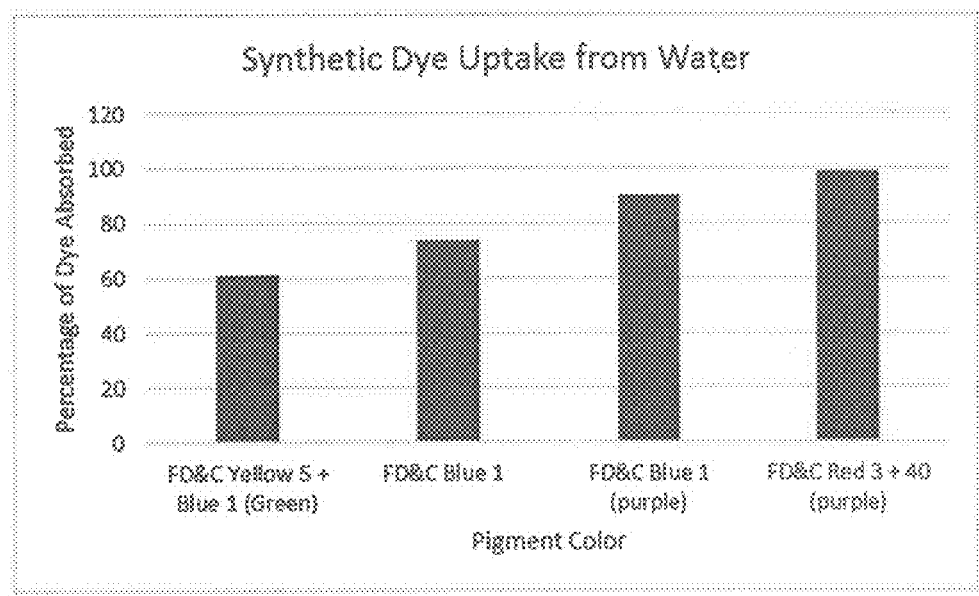
FIG. 3 illustrates a graph representing the capture of synthetic dyes from water with the 181D sorbent showing the percentage of the initial dye removed from feed solutions.
Figure 4:
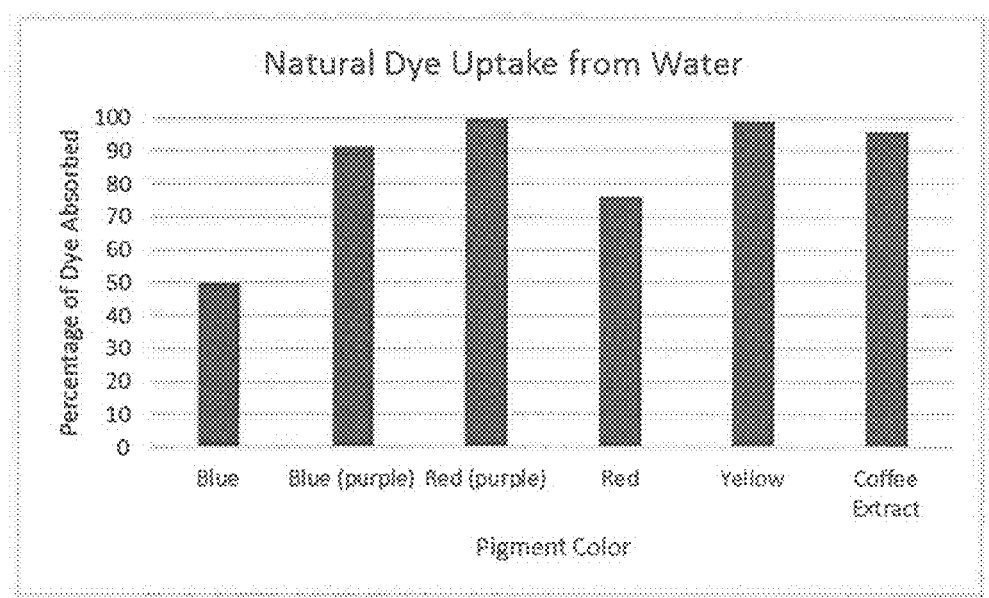
FIG. 4 illustrates a graph representing the capture of natural dyes from water with the 181D sorbent showing the percentage of the initial dye removed from feed solutions.

The BIAS 181 D, comprised of 40 wt % organics comprised of 12 wt % of PEI$_{800}$ and 28 wt % ECTMS (ECTMS/PEI ratio of 28/12), on $SiO_2$, retained all of its organic content after being exposed to flowing $H_2O$ and aqueous dye solutions. This sorbent captured between 50 and 100% of different dyes or coffee from highly concentrated 0.5 to 1 wt % solutions. FIGS. 3 and 4 show the compiled results of single wavelength uptake measurements by 181D from column eluents with synthetic (FIG. 3) and natural (FIG. 4) dye containing feed solutions.

The chemical structure of the 181D sorbent was examined by diffuse reflectance infrared Fourier transform spectroscopy (DRIFTS) to confirm the covalent attachment of PEI to the silica surface by the epoxysilane (ES) linker.

Figure 5:
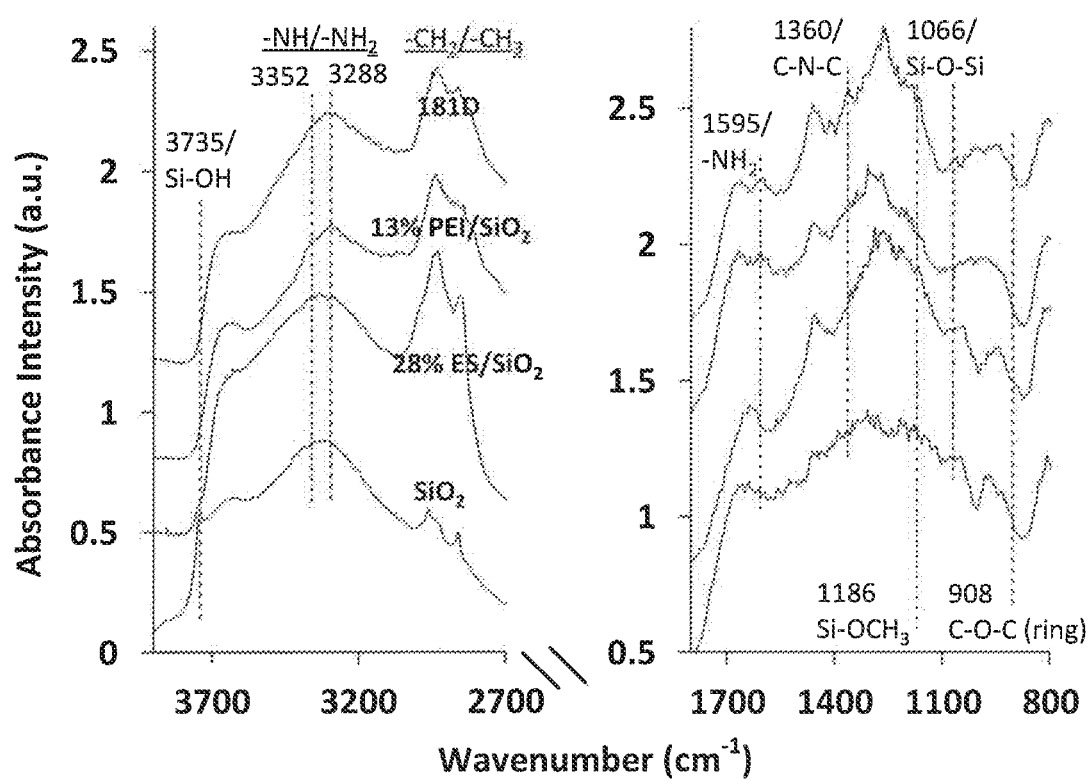
FIG. 5 illustrates a graph illustrating DRIFTS absorbance spectrum of the 181D sorbent as well spectra of 13 wt % PEI800/silica, 28 wt % epoxysilane/silica, and pure silica as references. The absorbance spectra were obtained by Abs.=log(1/I) where I was the normalized single beam spectra of the samples and were collected at 50° C. after heating the sorbents at 105° C. for 12 min in flowing $N_2$ to desorb pre-adsorbed $H_2O$ and $CO_2$ from the environment and then cooling down.

FIG. 5 depicts DRIFTS absorbance spectrum of the 181D sorbent as well spectra of 13 wt % PEI$_{800}$/silica, 28 wt % epoxysilane/silica, and pure silica as references. The absorbance spectra were obtained by Abs.=log(1/I) where I was the normalized single beam spectra of the samples and were collected at 50° C. after heating the sorbents at 105° C. for 12 min in flowing $N_2$ to desorb pre-adsorbed $H_2O$ and $CO_2$ from the environment and then cooling down. The IR features confirm the grafting reaction between the ES methoxy groups and the silica hydroxyl groups, which produced the epoxysilane-silica species.

Table 3 compares the performance of different sorbent materials for their recovery of various dyes from aqueous solutions under various conditions. Percentage of organic contaminate removed by being bound to the BIAS is determined by measuring the concentration of the dye in the treated eluent then dividing by the concentration in the feed and multiplying by 100. In one embodiment, a preferred percent bound is greater than 50%. In one embodiment, a preferred percent bound is greater than 80%.

TABLE 3 compares the performance of different sorbent materials for their recovery of various dyes
from aqueous solutions under various conditions.

| Sorbent Name | Description | Dye | Dye conc.; soln. pH | Sorb./Soln. ratio (g/g) | Ads. Time | % Dye removal; sorbent dye loading |
|---|---|---|---|---|---|---|
| DETA/CNT | Diethylenetriamine (DETA)-functionalized carbon nanotubes (CNT) | Acid blue 45, anionic | 100 mg/L; 2 | 0.1/1,000 | 60 min | ~60%; (60 mg/g) |
| DETA/CNT | Diethylenetriamine (DETA)-functionalized carbon nanotubes | Acid black 1, anionic | 100 mg/L; 2 | 0.1/1,000 | 60 min | ~55%; (55 mg/g) |
| Amberlite IRN-78 | anion exchange resin | Methyl orange, anionic azo | ~271 mg/L; 11 | 0.05/20 | >12 hrs | ~164 mg/g |
| Amberlite IRN-78 | anion exchange resin | Acid orange 10, anionic azo | ~375 mg/L; 11 | 0.05/20 | >12 hrs | ~307 mg/g |
| i-carrageenan/ FeO2 | magnetic nanoparticles | Methylene Blue, cationic | 100 mg/L; 10 | 0.02/40 | 60 min | ~33%; 65.6 mg/g |

TABLE 3-continued compares the performance of different sorbent materials for their recovery of various dyes from aqueous solutions under various conditions.

| Sorbent Name | Description | Dye | Dye conc.; soln. pH | Sorb./Soln. ratio (g/g) | Ads. Time | % Dye removal; sorbent dye loading |
|---|---|---|---|---|---|---|
| MS-APTES | Aminopropyltriethoxysilane-grafted mesoporous silica | Alizarian red S, anionic | 15 mg/L; 6 | 0.01/10 | 15 min | 98%; ~14.7 mg/g |
| MS-PEI | PEI-grafted mesoporous silica via glutaraldehyde linker | Alizarian red S, anionic | 15 mg/L; 6 | 0.01/10 | 15 min | 88%; 13.2 mg/g |
| DETA/WNS | DETA-grafted treated walnut shell (WNS) via epichlorohydrin | Reactive brilliant red K-2BP, anionic | 200 mg/L; 2 | 5/1,000 | 180 min | 83%; ~330 mg/g |
| TREN-SBA-15 | Tris(2-aminoethyl)amine-functionalized SBA- | Malachite green, cationic | 250 mg/L; 7 | .12/1,000 | 60 min | ~77%; ~1600 mg/g |
| Lewarit MonoPlus | cation exchange resin | C.I. Basic Blue 3 dye, cationic | 100 mg/L | 0.5/50 | 60 min | ~>98%; ~10 mg/g |
| GEPM-1 | polyethylenimine-functionalized graphene oxide | Amaranth, anionic azo | 50 mg/L | .01/200 | 50 min | ~68%; ~675 mg/g |
| GEPM-1 | polyethylenimine-functionalized graphene oxide | Orange G, anionic azo | 50 mg/L | .01/200 | 50 min | ~23%; ~225 mg/g |
| GEPM-1 | polyethylenimine-functionalized graphene oxide | Rhodamine B, cationic | 50 mg/L | .01/200 | 50 min | ~2.5%; ~25 mg/g |
| Amberlite IRA- | anionic exchange resin | C.I. Reactive Red 2, anionic | 200 mg/L; 1-12 | 0.2/20 | 180 min | ~>99%; ~20 mg/g |
| Amberlite IRA- | anionic exhange resin | C.I. Reactive Black 5, anionic azo | 200 mg/L; 1-12 | 0.2/20 | 180 min | ~>99%; ~20 mg/g |
| Modified Chitosan | 84% deacetylated chitosan | FD&C red 40, anionic | 100 mg/L; 5.7 | 0.25/1,000 | ~50 min | ~75%; 300 mg/g |
| S. platensis, algae | algae nonparticles | FD&C red 40, anionic | ~600 mg/L; 6 | 0.25/1,000 | >8 hrs | ~10%; ~230 mg/g |
| 181D | Polyethylenimine (PEI)/epoxysilane-functionalized silica particles | FD&C red 40 + FD&C red 3, anionic azo | 1 wt % dye mix in H2O; N/A | 0.5/20 | 40 min | 94% |
| 181D | Polyethylenimine/epoxysilane-functionalized silica particles | Natural red | 1 wt % dye mix in H2O; N/A | 0.5/20 | 40 min | 77% |
| 40% E3/PEI/SiO$_2$ (0.54) | 40 wt % PEI/E3 network inside of 500 um silica pores (0.54 E3/PEI | Natural red | 1 wt % dye mix in H2O; N/A | 0.5/20 | 40 min | 99.5% |
| PEI4-MBAA1.5-APS0.25 | 14 wt % PEI-amide based hydrogel inside of 500 um silica particles | Natural red | 1 wt % dye mix in H2O; N/A | 0.5/20 | 40 min | 98% |

Easily prepared immobilized amine sorbents that contain polyamines plus epoxysilanes, non-silane epoxides, or amide-based linkers, immobilized on silica are structurally stable; capture a variety of dye and colorant species from flowing aqueous streams; and should be recyclable over multiple cycles. These low cost, scale-able, and robust materials show promise for commercial scale processes involving colorant removal from flowing aqueous streams or stationary aqueous environments.

Figure 6:
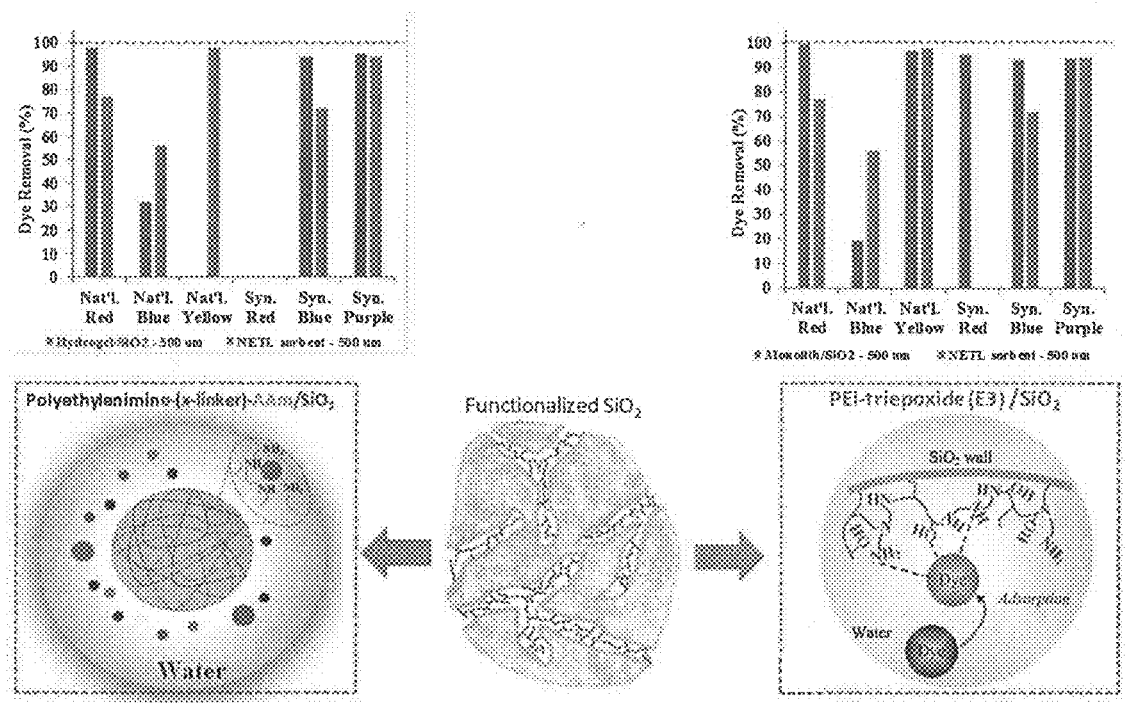
FIG. 6 illustrates a graph representing dye (1 wt %) removal from water using hydrogel-based and monolith-based, $SiO_2$ supported immobilized amine sorbents.

FIG. 6 depicts the removal of the natural and synthetic dyes from 1 wt % solutions by the monolith-based (PEI/epoxy/SiO$_2$) and hydrogel-based (PEI/AAm/MBAA/SiO$_2$) sorbents, using the identical set-up as that for the 181D BIAS tests. Results directly confirm equal or superior performance in dye uptake by both of the alternative materials.

Figure 7:
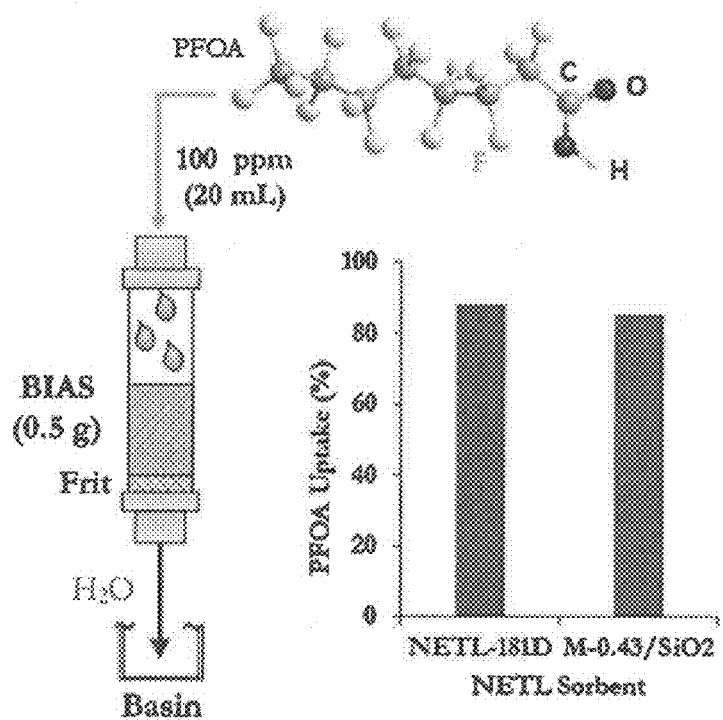
FIG. 7 illustrates the experimental set-up for and results of PFOA adsorption on layer-based 181D and monolith-based M-0.43/$SiO_2$ sorbents.

Removal of PFOA from a 100 ppm stock solution by 181D and the optimum monolith based sorbent, M-0.43/SiO$_2$, is shown in FIG. 7. Results showed that between 80 and 100% of the PFOA was removed by both sorbents, owing to the interaction between PFOA acid groups and PEI's amine groups.

Determining PFOA concentrations in the fresh and treated solutions was accomplished using the UV-Vis analytical method, where the 280 nm band intensity was used to quantify aqueous PFOA content. Contributions by trace amounts of leached amine to this band intensity for the treated solutions were subtracted off by, (i) obtaining the amine molar absorption coefficient of the amine at 280 nm by analyzing amine calibration solutions via a recently published UV-Vis/amine-$Cu^{2+}$ chelation technique, (ii) subtracting off the amine contribution to the 280 nm band intensity of a PFOA-treated solution, then (iii) using the resulting 280 nm band intensity to calculate the remaining PFOA concentration via a pure PFOA/H$_2$O calibration curve.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for removing an organic contaminant from wastewater,
comprising the steps of:
contacting the organic contaminant with a basic immobilized amine sorbent having an OCR value greater than 30, wherein the basic immobilized amine sorbent comprises a polyamine, an inorganic support, and a linker such that at least a portion of the organic contaminant is bound to the basic immobilized amine sorbent, which resists leaching in flow conditions.

2. The method of claim 1 wherein the polyamine is a polyethylenimine.

3. The method of claim 1 wherein the polyamine is tetraethylenepentamine.

4. The method of claim 2 wherein the polyamine has a MW ranging from about 200 g/mol to about 1,000,000 g/mol.

5. The method of claim 3 wherein the polyamine has a MW ranging from about 400 g/mol to about 1,000 g/mol.

6. The method of claim 1 wherein the linker is an epoxide, poly-epoxide or di-vinyl-linker.

7. The method of claim 6 wherein the linker is an epoxysilane linker.

8. The method of claim 6 wherein the linker is a tri-epoxide linker.

9. The method of claim 6 wherein the linker is a di-vinyl linker.

10. The method of claim 1 wherein the inorganic support is silica, alumina, or biochar.

11. The method of claim 10 wherein the inorganic support has an average particle size ranging from about 10 µm to about 800 µm.

12. The method of claim 10 wherein the inorganic base is a pellet with a pellet size ranging from about 0.5 mm to about 5 mm.

13. The method of claim 1 wherein the organic contaminant has a MW ranging from about 50 g/mol to about 2000 g/mol.

14. The method of claim 1 wherein the polyamine is a polyethylenimine, wherein the linker is an epoxysilane, and wherein the inorganic substrate is silica.

15. The method of claim 1 wherein the basic immobilized amine sorbent has an OCR greater than 50, wherein the polyamine is a polyethylenimine having a MW ranging from about 400 to about 1,000,000, wherein the linker is an epoxide, a mono or poly-epoxide or a di-vinyl-based linker, wherein the inorganic support is silica having an average particle size ranging from about 10 µm to about 500 µm, wherein the organic contaminant has a MW ranging from about 50 g/mol to about 2000 g/mol, and wherein the percentage of organic contaminant bound is greater than about 50%.

16. The method of claim 14 wherein the BIAS has an OCR greater than 80, wherein the polyamine is a polyethylenimine having a MW ranging from about 400 to about 1,000, wherein the linker is an epoxysilane, a mono or poly-epoxide or a di-vinyl-based linker, wherein the inorganic base is silica or alumina or Biochar having an average particle size ranging from about 10 µm to about 500 µm, or a pellet of 1 mm to 3 mm, wherein the basic immobilized amine sorbent has an OCR of greater than about 80, wherein the organic contaminant has a MW ranging from about 100 g/mol to about 1000 g/mol, and wherein the percentage of organic contaminant bound is greater than about 80%.

17. The method of claim 1 wherein the basic immobilized amine sorbent has a PCR value ranging from about 40 to about 100.

18. The method of claim 17 wherein the basic immobilized amine sorbent has a PCR value ranging from about 70 to about 100.

19. A method for removing an organic contaminant from wastewater, comprising the steps of:
contacting the organic contaminant with a basic immobilized amine sorbent having an OCR value greater than 80 and a PCR value ranging from about 70 to about 100, wherein the basic immobilized amine sorbent comprises a polyamine, an inorganic support, and a linker such that at least a portion of the organic contaminant is bound to the basic immobilized amine sorbent, which resists leaching in flow conditions.

* * * * *